United States Patent
Duelli et al.

(10) Patent No.: US 6,873,768 B2
(45) Date of Patent: Mar. 29, 2005

(54) COMPACT OPTICAL FIBER COUPLER

(75) Inventors: Markus Duelli, Santa Rosa, CA (US); Leland Scott Black, Sebastopol, CA (US); Robert W. Hallock, Santa Rosa, CA (US); Andrew Thomas Taylor, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 106 days.

(21) Appl. No.: 10/098,585

(22) Filed: Mar. 15, 2002

(65) Prior Publication Data

US 2002/0141705 A1 Oct. 3, 2002

Related U.S. Application Data (60) Provisional application No. 60/276,730, filed on Mar. 16, 2001.

(51) Int. Cl.$^7$ .............................. G02B 6/26; G02B 6/42; G02B 6/32
(52) U.S. Cl. .............................. 385/50; 385/31; 385/33; 385/34
(58) Field of Search .............................. 385/31, 33, 34, 385/38, 49, 50, 93

(56) References Cited

U.S. PATENT DOCUMENTS

| | | | |
|---|---|---|---|
| 4,205,901 A | 6/1980 | Ramsay et al. ............ | 350/96.31 |
| 4,268,112 A | 5/1981 | Peterson ................... | 350/96.18 |
| 4,456,330 A | 6/1984 | Blüdauii ................... | 350/96.18 |
| 4,701,011 A | 10/1987 | Emkey et al. ............ | 350/96.18 |
| 4,737,004 A | 4/1988 | Amitay et al. ............ | 350/96.15 |
| 5,337,380 A | 8/1994 | Darbon et al. ............ | 385/28 |
| 5,457,759 A | 10/1995 | Kalonji et al. ............ | 385/31 |
| 6,014,483 A | 1/2000 | Thual et al. ............ | 385/33 |
| 6,445,939 B1 * | 9/2002 | Swanson et al. ............ | 600/342 |
| 6,542,665 B2 * | 4/2003 | Reed et al. ............ | 385/34 |
| 6,594,419 B2 * | 7/2003 | Ukrainczyk et al. ............ | 385/33 |

* cited by examiner

Primary Examiner—Rodney Bovernick
Assistant Examiner—Kevin S. Wood
(74) Attorney, Agent, or Firm—Allen, Dyer, Doppelt, Milbrath & Gilchrist, P.A.

(57) ABSTRACT

The inventive coupling device enables a high interconnection density of single mode optical fiber in active and passive devises used in a fiber optic telecommunication system. The coupling device comprise a micro-lens formed by terminating a single mode optical fibers with an optimized gradient index fiber, thus avoiding a significant increase in fiber diameter. The gradient index is optimized to provide a long working distance to the minimum spot size so that efficient coupling can be achieved in a free space interconnection between either multiple single mode fibers or a single mode fiber to a transmitting or receiving device.

6 Claims, 5 Drawing Sheets

COMPACT OPTICAL FIBER COUPLER

CROSS REFERENCE TO RELATED APPLICATIONS

The present application claims priority to provisional application having Ser. No. 60/276,730 filed Mar. 16, 2001, entitled Compact Optical Fiber Coupler, which is incorporated herein by reference.

BACKGROUND OF INVENTION

In an optical communications system optical signals may be transmitted in free space, but are generally transmitted over optical waveguides, typically optical fibers. Since optical fiber transmission offers tremendous bandwidth and transmission rate advances over the transmission of electrical signals, conversion to electrical signals are avoided as much as possible by active optical processing such as optical amplification, switching and routing. It is usually desirable to avoid conversion of the signal to an electrical signals until they reach the target destination, where they are converted back to electrical signals representing digital data, voice or images in various analog formats.

In order to maximize the capacity of fiber optic communication systems many signal are simultaneously transmitted over the same fiber waveguides in a scheme known as wavelength division multiplexing or WIDM. In WDM each discrete signal may correspond to a different wavelength of light, known as an optical channel. Various non-linear properties of optical glass, active and passive components in the optical system, produce cross talk between the WDM optical signal channel. This "cross talk" is insignificant if the signal to noise ratio is high and the power levels of all optical channels are comparable.

The optical devices and interconnections in any route will result in signal losses, thus the signal power and signal to noise ratio of any optical signal can be expected to vary with the routing path. When the communication system is a network, optical channels are combined and routed together in common waveguides with signals from different sources the power levels in each optical channels are likely to be different, in which case the "cross-talk" from the stronger channels will degrade the signal to noise ratio in the weaker channels.

Therefore, low insertion and high isolation is a substantial consideration in the design and operation of all optical communication system components. While very low losses can be obtained by fusion splicing optical fibers of similar composition many passive and active components preclude direct connections because of intermediate components, such as filters, mirrors or prisms, which route or multiplex/de-multiplex the optical signal channels. In a typical device a single mode optical fiber is connected to the device at a first, or input, port and one or more additional single mode optical fibers are connected at additional ports. Light exiting the optical fiber at an input port is collimated into a substantially parallel beam by a lens. Additional lenses located at the output ports converge the collimated beam into the outgoing optical fiber connected thereto. Lateral and angular offsets of the collimating elements contribute to the signal loss. Since the collimated beam diameter is many times the diameter of the fiber core, typically 10 microns, the signal loss due to lateral offset is reduced. However, the sensitivity of signal loss to angular offset increases with beam diameter.

However, the typical macroscopic collimated lenses present limitations in miniaturizing devices or increasing the interconnection density without increasing the device or package size considerably. While several methods have been suggested for fabricating a lens on the end of a single mode optical fiber they are not suitable when there must be very low signal loss or a miniature device, such as optical cross-connect switches or multiplex/de-multiplex device.

Several patents describe how a refractive surface of micro-lenses can be formed or attached to the surface of a single mode fiber. In U.S. Pat. No. 4,268,112 to Paterson a Luneberg type lens with a gradient of refractive index is attached to the end of an optical fiber, however the lens diameter is larger than the fiber diameter. In U.S. Pat. No. 4,205,901 to Ramsey et al. a single mode fiber is terminated with a core end region having a core with a graded composition and increasing thickness towards the end of the fiber. In U.S. Pat. No. 4,456,330 to Bludau a homogeneous glass rod is welded to the end of a fiber and rounded by heat treatment to form a hemispherical lens. However, these design either have significant disadvantages with respect to achieving a high interconnection density devices, for example the formation of an adequate lens either increases the diameter of the single mode fiber, or distorts the edge, thus making the subsequent alignment necessary to achieve low insertion loss difficult, or have a high return loss. The additional components increase the complexity of assembly and result in additional signal loss from splice misalignment.

Another approach to forming a single mode fiber with a micro-lenses function is to fuse a short section of multimode optical fiber to the terminal end of a single mode fiber wherein the multimode fiber acts as a gradient index lens, such as in U.S. Pat. No. 4,701,011 by Emkey et al. Alternatively the refractive index may be tapered linearly, such as in U.S. Pat. No. 4,737,004 to Amitay et al., or U.S. Pat. No. 5,337,380 to Darbon et al. However, it has been found that such devices are not suitable in miniature devices because they cannot easily be aligned, due to irregularities in the surface shape at the fusion joint, and/or do not shape the exiting beam in a manner compatible with both low loss and a high-density of interconnection.

In U.S. Pat. No. 6,014,483 Thual et al. teach that it is possible to increase the working of distance of—coupler taught by Emkey et al. by adding a silica spacer between the single mode fiber and the multimode. U.S. Pat. No. 5,457,759 to Kalonji et al. discloses combining in succession: a piece of graded index multimode fiber, a piece of step index multimode fiber and a micro-lens, wherein the terminating micro-lens is a curved refracting surface. However, such configurations appear too difficult to manufacture without increasing or distorting the outer diameter, which is problematic in alignment and assembly. Furthermore, such combinations suffer undesirable back reflection or return loss.

Accordingly, it is an object of the current invention to provide a compact optical fiber coupler suitable for the miniaturization of high-density interconnection devices.

SUMMARY OF INVENTION

Figure 1:
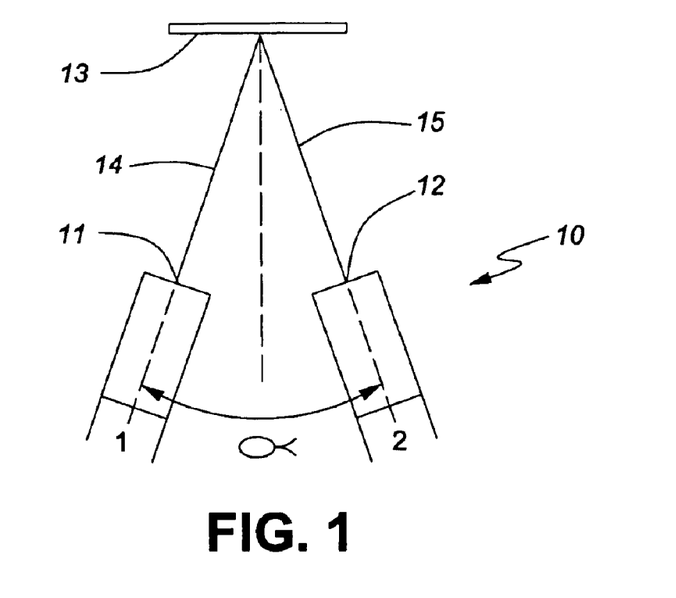
FIG. 1 illustrates the optical principles and benefits of the inventive optical coupler in forming high interconnection density devices.

FIG. 1 illustrates the benefits of the inventive optical coupler in forming a high interconnection density device 10. Optical signals arriving from waveguide 1 are transmitted to waveguide 2 after reflection of surface 13 in device 10. To avoid signal losses the optical power arriving from waveguide 1 must be efficiently coupled between device input port 11 and device output port 12. Light emitted by the waveguide 1 must be fully collected at output port 12 for re-transmission via waveguide 2 after reflection at surface 13. The inventive optical coupler modifies the free space propagation of light emitted by waveguide 1 and the collection of such light into waveguide 2 such that ports 11 and 12 may be considered object and image points separated by a working distance (WD) equal to the length, L, of segments 14 and segment 15, i.e. WD equals 2L.

If waveguides 1 and 2 are single mode optical fibers separated by angle alpha the ultimate limitation on decrease the optical device size is the optical fiber diameter as well as decreasing alpha forward zero, that is all optical fiber are parallel or nearly parallel and adjacent each other. To reduce alpha to a few degrees and still utilize only a single reflective surface as simplest beam path requires a longer working distance if signal loss is to be avoided as the coupling efficiency is optimum when the optical couplers are positioned at the optical working distance.

As alpha approaches 0 the angle of incidence with respect to reflective surface 13 (alpha/2) results in a desirable reduction in polarization dependent loss. If reflective surface 13 is an interference filter, the long working distance provides the additional benefit of reducing the angle of incidence, thus minimizing the potential polarization splitting, spectral shift characteristic of interference filters among several other signal degrading effects.

Figure 2:
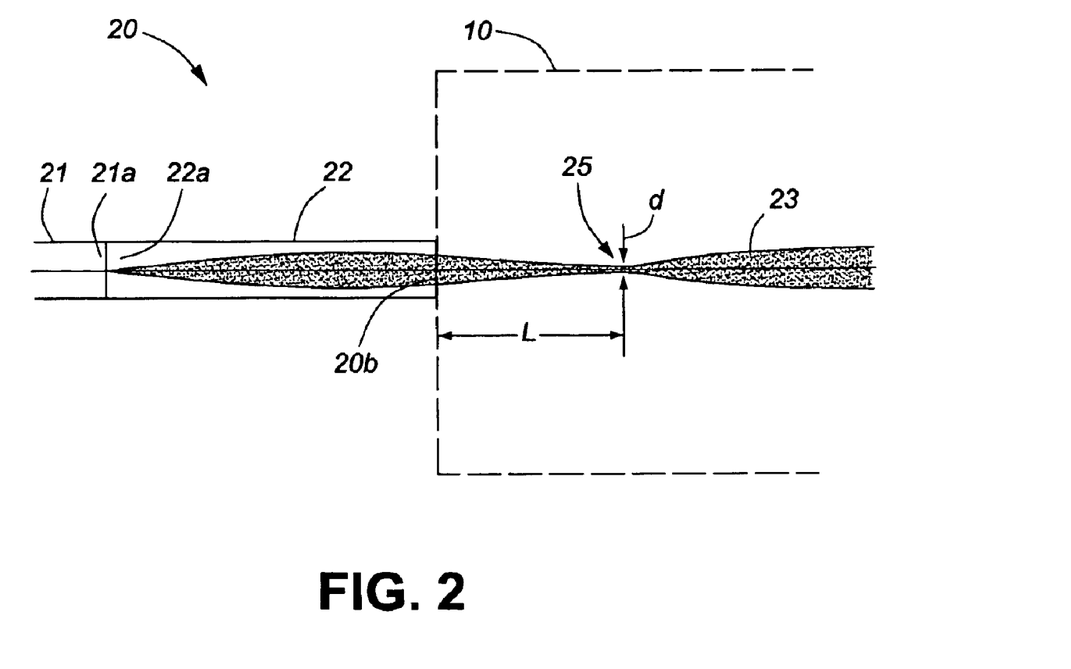
FIG. 2 illustrates the first embodiment of the inventive compact optical fiber coupler.

FIG. 2 illustrates a first embodiment of the inventive compact optical fiber coupler wherein efficient coupling is achieved at a long working distance without increasing the diameter of the waveguide or optical fiber 21. Optical signals are transmitted through optical fiber 21 toward the input port 20b of device 10 coincident with the terminal end 20a of compact optical coupler 20. Optical coupler 20 comprises a section of gradient index fiber 22 in optical communication with the terminal end 21a of optical fiber 21 such that a free space propagating optical beam 23 is reduced to a small spot 25 of diameter d at a distance L from the terminal end 22a of gradient index fiber 22. Placing a reflecting surface or other optical element coincident with the location of small spot 25 permits selective filtration or routing of the optical signals arriving from optical fiber 21 to any other optical fiber terminated with a corresponding optical coupler at one or more output ports (not shown) of device 10.

DETAILED DESCRIPTION

Figure 3:
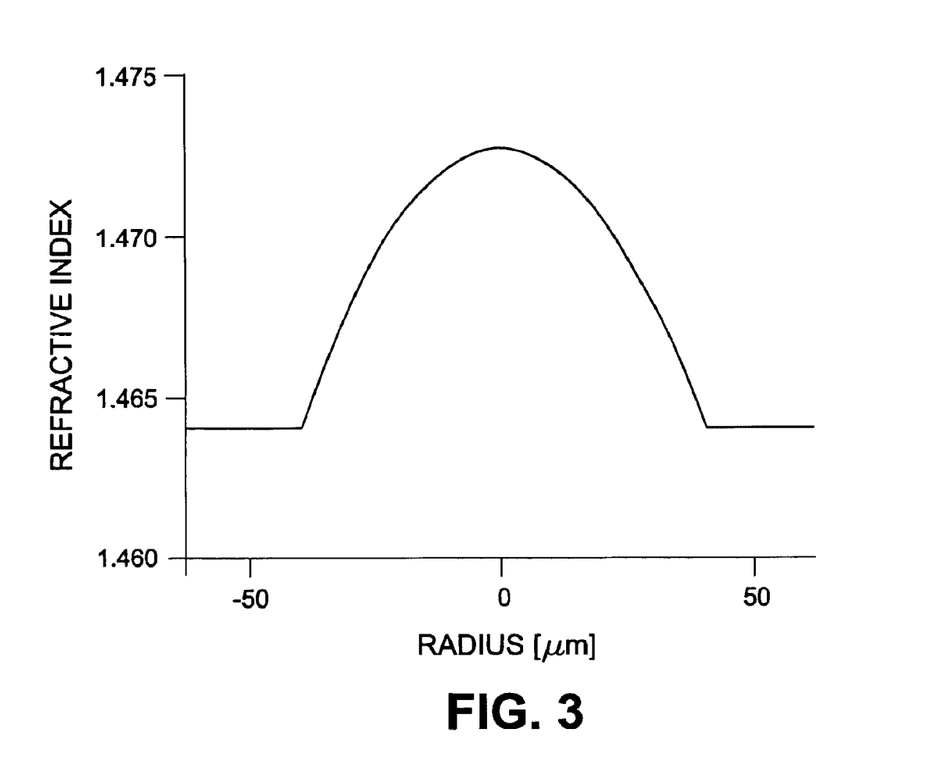
FIG. 3 illustrates the preferred refractive index profile for the gradient index fiber in the inventive compact optical fiber coupler.

In order to achieve the long working distance, WD, between optical ports the gradient index fiber has a predetermined profile of refractive index, which is illustrated in FIG. 3.

FIG. 3 illustrates the preferred refractive index profile for the compact optical fiber coupler. The profile corresponds to equation 1:-

$$n(r)=n_0[1-g^2r^2/2]$$

wherein g=2.7/mm and $n_0$=1.49 at a wavelength of 1.55 microns.

The gradient fiber is produced by conventional drawing of a doped fiber preform fabricated with the corresponding Ge/P-SiO2 glass composition profile. The total difference in index within the preform, which corresponds to the gradient in the fiber, is less than about 0.001. In the fiber core region, represented by the refractive index gradient, is preferably greater than about 70 to 80 microns. This gradient of refractive index and core diameter results in an optical coupler having a working distance of about 550 to 600 microns and a spot size of about 18 microns when the section of gradient index fiber is about 815 microns long.

It should be recognized that both the gradient and core region of the fiber could be varied from these preferred parameters to either increase the working distance further, or both the total index change and core diameter can be increased to obtain substantially the same working distance. Since the preferred optical coupler does not increase the diameter of the single mode fiber, which would limit the potential interconnection density, the core diameter is preferably no greater than about 75 percent of the single mode fiber cladding diameter, which is about 125 microns.

The single mode fiber and gradient index fiber can be placed in optical communication by numerous means, such as optical contacting, adhesive bonding, index matching fluid or gel, or spacing with an air gap or a homogeneous optical material, such as fused silica, an oxide or silicon and the like. Such an optical spacer may include or consist of one of more thin film coatings, such as an anti-reflection coating at the end of the optical fiber at an air gap spacing. However, a preferred embodiment is fusion bonding the interface between the single mode fiber and the gradient index fiber. A longer than required section of gradient index fiber is first fusion bonded to the single mode fiber, after which the gradient index fiber is shortened to its final length. Methods of shortening the gradient index fiber include cleaving and polishing.

In order to achieve the long working distance with the optimum gradient index fiber the length of the gradient index fiber section is preferably controlled to within an absolute precision of +/- 15 microns, which over a length of about 700 micron represents a deviation about 2.5% percent.

Although the preferred means of forming a planar surface is a conventional cleaving process, this is not entirely compatible with using a fusion bonding process. It appears that the conventional fusion process adversely changes the fracture mode of the gradient index fiber within the region where the gradient index fiber should be terminated to obtain the desired long working distance and spot size characteristics such that a non-planar surface is formed leading to undesirable back reflection and or signal loss. Not wishing to be bound by theory we believe the stress state modifies the fracture mode during cleaving from the ideal linear propagation necessary to form the perfect planar interface necessary for low coupling loss, having discovered that a subsequent reduction of the local stress state enables the achievement of low coupling losses with conventional angle cleaving.

Although a range of heating methods, such as laser, flame annealing, or oven annealing will produce the necessary stress reduction, the simplest approach has been to utilize the low power arc mode provided as a standard setting on the fusion splicing equipment. Alternatively, the entire assembly could be annealed for a functional equivalent soak time at some temperature below the glass transition temperature and softening point of the glass.

Since final angle cleaving of the gradient index fiber section is done in the fusion bonding apparatus it is preferable to anneal the gradient index fiber within the fusion bonding apparatus by programming the heating cycle and fiber transport accordingly, depending on the heating mode and area of the fusion bonding system.

Figure 4:
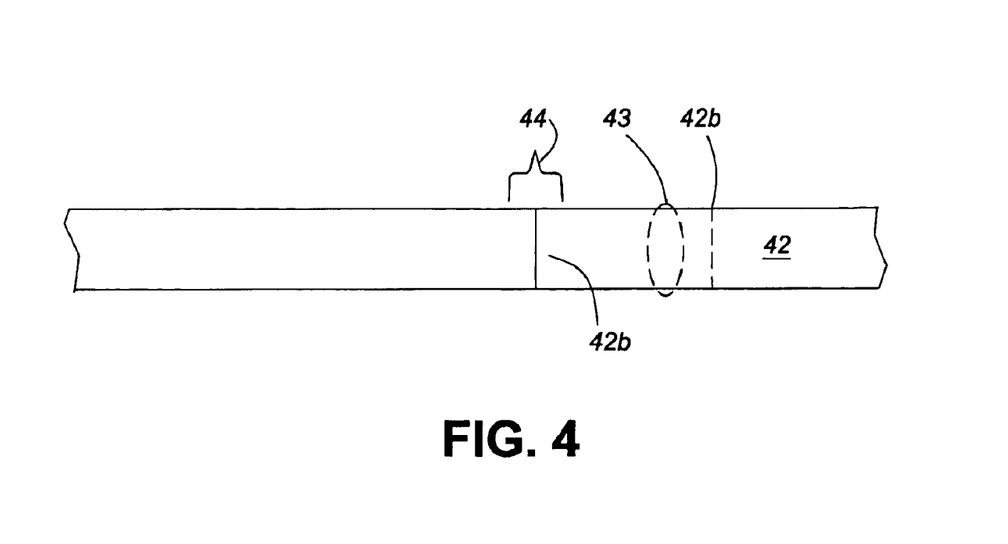
FIG. 4 illustrates the method of joining a single mode fiber to a gradient index fiber to form the compact optical fiber coupler.

This preferred method of stress reduction is illustrated in FIG. 4, as fiber 42, which is to be cleaved at dotted line 42b is annealed within the fusion bonding apparatus by localized annealing at region 43 about 500 microns distal from the fusion joint 44. Preferably the arc power is reduced to about 35% of the fusion power while the arc duration is reduced to about 45% of the arc time. The lower power arc is repeated, typically 4 to 5 times, prior to cleaving the fiber 42 at location 42b.

Figure 5A:
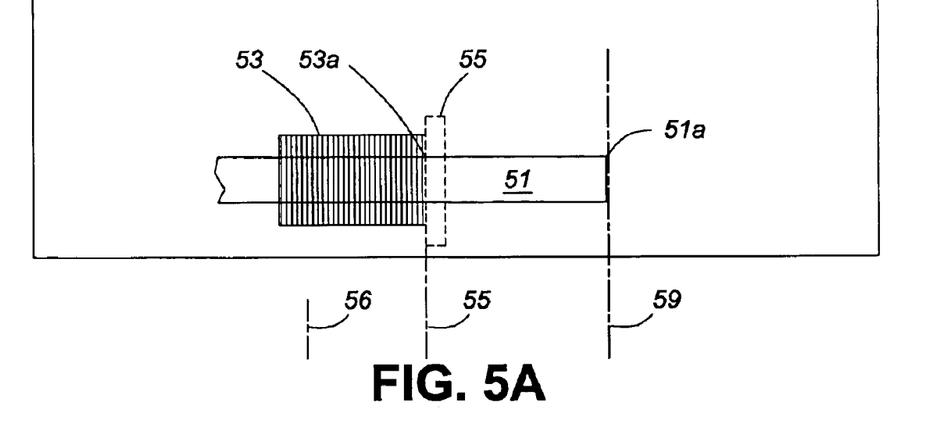
FIG. 5 illustrates the method of cleaving the gradient index fiber after attachment to the single mode fiber to obtain a low back reflection, or return loss.
Figure 5B:
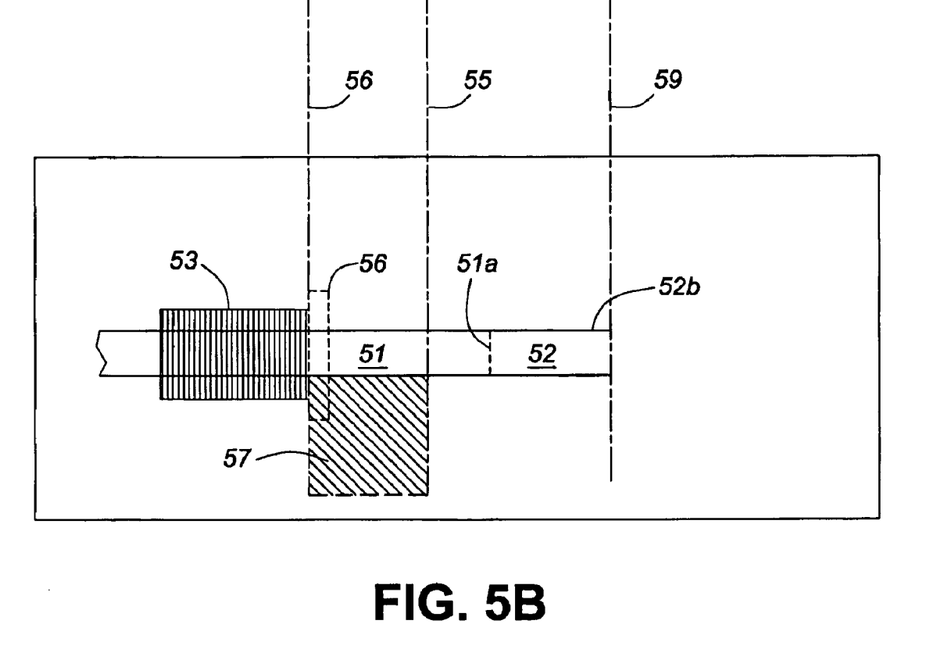

An additional aspect of the invention is a reproducible method of fabricating the optical coupler with the appropriate length of gradient index fiber section to achieve the desired small spot size for compact devices. Accordingly, a preferred method of reproducibly controlling the length of the gradient index fiber is illustrated in FIG. 5a and 5b. In order to reproducibly manufacture the optical coupler by this method a fiber reference 53, such as a removable clamp, is attached to the single mode optical fiber 51 before a first cleaving step. Surface 53a of fiber reference 53 provides a first fiducial reference a surface protuberance from the optical fiber. Surface 53a is placed in contact with a first fixed reference plane 55, which is extended as a dashed line between FIGS. 5a and 5b (forming a second fiducial reference). The first fixed reference plane 55 is fixed location on a conventional fusion-bonding instrument having an integrated fiber-cleaving tool, the cleaving location illustrated by dashed line 59. Optical fiber 51 is then cleaved to form a clean perpendicular face 51a. In the preferred embodiment a substantial length of the gradient index fiber 52 is then fusion bonded to cleaved face 51a of single mode fiber 51 without removing single mode fiber 51 from the first fiducial reference. Prior to making the final cleave that terminates gradient index fiber 52, the resulting fused single mode fiber and gradient index fiber combination are remounted by positioning surface 53a of the fiber reference in contact with a second first fixed reference plane 56 on the fusion-bonding instrument, which serves as a third fiducial reference. Accordingly, the desired cleavage point 52b has translated and is stabilized in a final location on the fusion bonding/cleaving tool apparatus fixing the final length of the gradient index fiber segment suitable for the desired microlens function. The length of the gradient index fiber segment is equal to the distance from the first fixed reference plane 55 to the second fixed reference plane 56. The second fixed reference plane 56 is easily defined or modified by inserting a spacer block 57 between surface 53a of the fiber reference and the first fixed reference plane 55. The thickness of this spacer block length thus determines the length of gradient index fiber segment 52.

Figure 6:
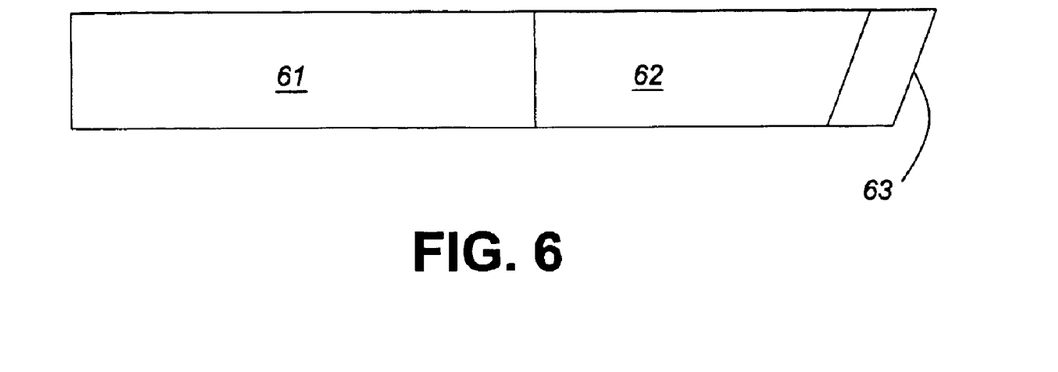
FIG. 6 illustrates a preferred embodiment of the compact optical fiber coupler wherein the angle cleaved face of the gradient index fiber comprises an anti-reflection coating.

In order to reduce the reflection and insertion losses the terminal end of the optical coupler is a planar surface which deviate slightly from applying perpendicular to the optical axis of the single mode optical fiber, preferably about 3 degrees. The insertion loss of the device can be further reduced by coating this planar surface with an antireflection coating, as illustrated in FIG. 6. Anti-reflection coating 63 is deposited on cleaved or polished face 62b of gradient index fiber 62. The combination of an angle cleave at face 62b and anti-reflection coating 63 increases the return loss to a value greater than 55 dB.

The inventive coupler is preferably used in a compact optical switch or cross-connect that is fabricated from a monolithic substrate, such as silicon, wherein the photolithography methods can be used to fabricate optical components, preferably translatable mirrors, and the associated actuator devices. The small spot size of the inventive optical coupler allows fixed or translatable mirrors to be reduced in size accordingly.

Figure 7:
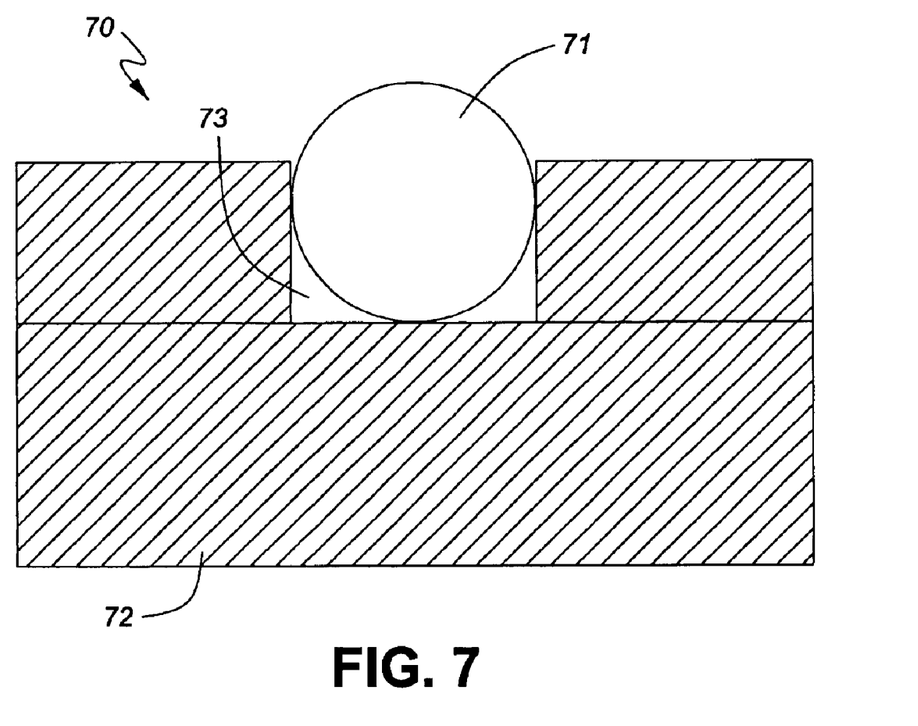
FIG. 7 is a cross section of a portion of an optical device showing the optical coupler mounted in a square-shaped groove fabricated on a silicon wafer.

An additional aspect of the invention is a method of fabricating the inventive optical coupler so that is capable of being mounted precisely in the final optical device. As the spot diameter is preferably less than 30 microns, the optical coupler must be fabricated in a manner that does not interfere with mounting within a tolerance of several microns in order to avoid signal losses. FIG. 7 illustrates the preferred method of mounting optical coupler 71 in optical device 70 via cross-section transverse to the optical beam propagation direction. Optical coupler 71 is contained within a square-shaped groove fabricated on a silicon wafer 72. Such grooves are routinely formed by a photolithographic methods. In order to achieve accurate placement with respect to the other optical components and ports within optical device 70 the fusion joint region must not increase the optical coupler diameter at the fusion bond, or any region which is to be placed with the square-shaped-groove 73. Thus, the deviation from the circular figure of the optical fiber should be less than 5 microns, preferably less than about 1 micron.

Figure 8A:
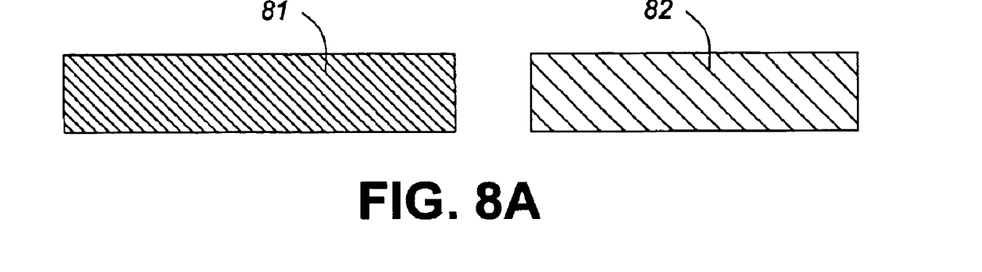
FIG. 8 illustrates the steps in fusion bonding optical fibers having dissimilar glass transition temperatures or viscosity at the fusing temperature so as to avoid deviation from the circular figure of the adjacent portions of the optical fibers.
Figure 8B:
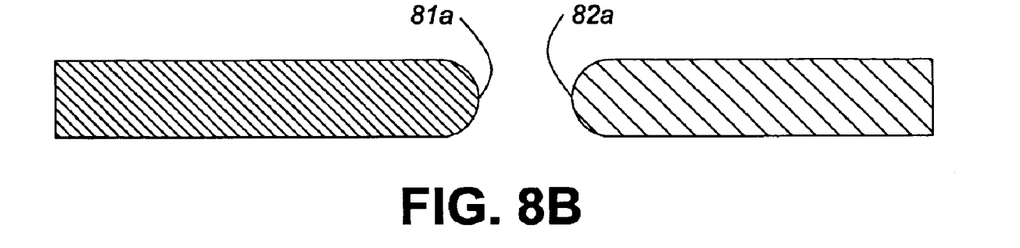
Figure 8C:
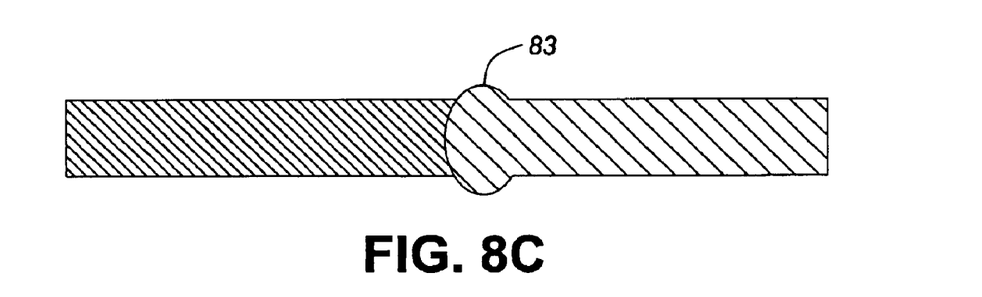
Figure 8D:
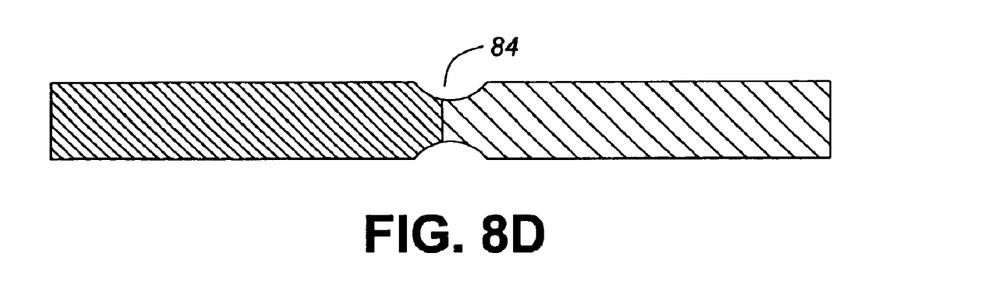
Figure 8E:
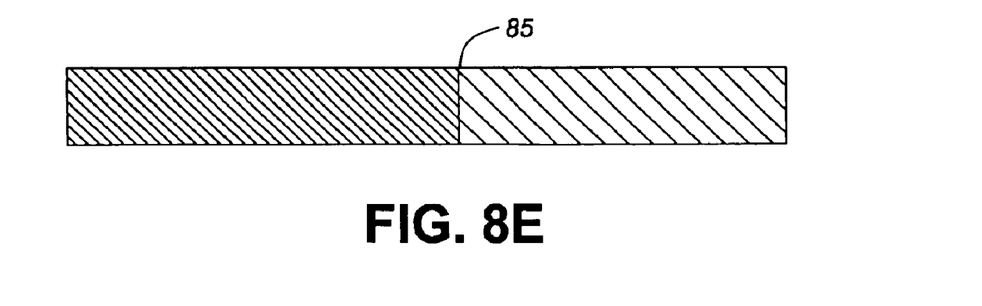

Avoiding such deviations at the fusion bond requires an optimization of the fusion process according to the glass transition temperatures and viscosity of the glasses of both the single mode fiber and the gradient index fiber, which will vary in the radial direction due to the composition gradient. Commercially available fusion splicing/bonding equipment can be utilized to achieve such smooth fusion joints provided the heating and mechanical movement of the fibers are independently programmable for incremental adjustments so as to accommodate a wide range of glass compositions. As FIGS. 8a–e illustrate we have determined that the principal parameters are the arc power, dwell time and fiber pushed together distance and the pull apart distance (during the arc.) FIG. 8a illustrates a single mode fiber 81 and gradient index fiber 82 brought into close proximity immediately before fusion bonding. FIG. 8b illustrates the distortion at the terminal ends of optical fibers 81a and 82b from heating. The gradient index fiber 82 has a lower glass transition temperature or melt viscosity which results in greater rounding at terminal end 82a after heating to the same or similar temperature as single mode fiber 81. FIG. 8c illustrates the result of the fusing the heated fiber ends by pushing the ends of fibers 81 and 82 together in that a bulbous protrusion 83 form in gradient index fiber proximal to the fusion joint due to the considerably lower melt viscosity of the glass. This protrusion 83 can be removed to form a substantially smooth fusion joint 85, shown schematically in FIG. 8e, by pulling the fibers apart immediately after fusing but before the molten glass has cooled. The pull apart distance or stroke will generally be less than the push distance or stroke, depending on the glass compositions, the area heated and the local temperature. As illustrated in FIG. 8d, excessive pulling produces a taper 84 at the fusion interface, thus optimum conditions can be found by producing a series of samples by increasing the pull apart stroke a fixed increment until the bulge is either eliminated or a taper is produced. By further incremental adjustment of the aforementioned parameters the deviation from the circular figure of the optical fiber can be reduced to less than 5 microns, preferably less than 1 micron.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A fiber-optic optical coupling assembly comprising:
   a) a first optical waveguide having a first terminal end,
   b) a first section of graded index fiber having a first terminal end and a second terminal end, wherein the first terminal end of said graded index fiber is in optical communication with the first terminal end of the first optical waveguide whereby an optical beam propagating from the first terminal end of the first optical waveguide and exiting the second terminal end of the graded index fiber is reduced to a diameter d at distance from the terminal end of the graded index fiber L, wherein d is less than about 30 microns and L is greater than about 220 microns;
   c) a second optical waveguide having a first terminal end,
   d) a second section of graded index fiber having a first terminal end and a second terminal end, wherein the first terminal end of said second graded index fiber is in optical communication with the first terminal end of the second optical waveguide whereby the second optical waveguide and the second section of graded index fiber have substantially same characteristics as the first optical waveguide and the first section of graded index fiber, respectively; and,
   e) a reflective surface disposed a distance L from the second terminal end of the first graded index fiber and disposed a distance L from the second terminal and of the second graded indeed fiber.

2. A fiber-optic coupling assembly according to claim 1 wherein the first optical waveguide is a single mode optical fiber and wherein the coupling assembly forms a part of an optical switch or cross connect.

3. A fiber-optic coupling assembly according to claim 1 further comprising an optical spacer selected from the group consisting of; a. an air gap, an oxide of silicon, index matching fluid and an index matching gel, wherein the optical spacer is between the first terminal end of said optical waveguide and the first terminal end of said graded index fiber, whereby the optical beam is expanding from the core section of the single mode optical fiber prior to entering said gradient index fiber section wherein the optical spacer comprises a thin film coating.

4. A fiber-optic optical coupling assembly comprising:
   a) a first optical waveguide having a first terminal end,
   b) a first section of graded index fiber having index of refraction gradient characterized by a change in refractive index of less than about 0.009 over a core diameter of about 80 microns wherein a first terminal end of said graded index fiber is in optical communication with the first terminal end of the first optical waveguide whereby an optical beam propagating from the first terminal end of the first optical waveguide and exits a second terminal end of the graded index fiber;
   c) a second optical waveguide; and,
   d) a second section of graded index fiber, wherein the second optical waveguide and
   the second section of graded index fiber are in optical communication with each other, the second optical waveguide and second section of graded index fiber having substantially same physical characteristics as the first optical waveguide and first section of graded index fiber, respectively; and,
   a reflective element disposed to receive a beam exiting the second terminal end of the first graded index fiber and reflect said light to an outer end face of the second section of graded index fiber, wherein the reflective element is disposed at a distance L from the two graded index fibers such that a waist of the beam is located at the reflective element.

5. An fiber-optic optical coupling assembly according to claim 4, wherein the second terminal end of the graded index fiber is formed by cleaving at an angle of about 3 degrees from a reference plane perpendicular to the optical fibers axis.

6. An fiber-optic optical coupling assembly according to claim 4, the assembly further comprising an anti-reflection coating at the second terminal end of the gradient index fiber.

* * * * *

UNITED STATES PATENT AND TRADEMARK OFFICE
CERTIFICATE OF CORRECTION

PATENT NO. : 6,873,768 B2
APPLICATION NO. : 10/098585
DATED : March 29, 2005
INVENTOR(S) : Duelli et al.

It is certified that error appears in the above-identified patent and that said Letters Patent is hereby corrected as shown below:

Col. 7, line 46, "indeed" should read -- index --

Signed and Sealed this

Eighth Day of August, 2006

JON W. DUDAS
*Director of the United States Patent and Trademark Office*